United States Patent Office 3,748,293
Patented July 24, 1973

3,748,293
PROCESS FOR PREPARING ALKYD-ACRYLIC GRAFT COPOLYMERS
John A. Torelli, Long Island City, N.Y., assignor to E. I. du Pont de Nemours and Company, Wilmington, Del.
No Drawing. Filed May 18, 1971, Ser. No. 144,640
Int. Cl. C08g 17/10, 39/10
U.S. Cl. 260—21    12 Claims

ABSTRACT OF THE DISCLOSURE

The novel process of this invention is directed to the preparation of graft copolymers having an alkyd resin backbone and side chains of polymerized ethylenically unsaturated monomers and comprises the following steps:

(1) Blending an alkyd resin having reactive hydroxy groups with side chain monomers of a hydroxy-containing acrylic monomer and other ethylenically unsaturated monomers such as styrene, alkyl methacrylate, alkyl acrylate, acrylonitrile, methacrylonitrile or mixtures of these monomers and a polymerization catalyst;
(2) reacting the mixture of about 2–15 hours and
(3) adding a melamine resin or a urea/formaldehyde resin and an acid catalyst to the reaction mixture and continuing the polymerization reaction to form the graft copolymer.

BACKGROUND OF THE INVENTION

This invention relates to a process for preparing graft copolymers and in particular to an improved process for preparing a high quality alkyd-acrylic graft copolymer.

The preparation of graft copolymers is well known in the art as taught by Schmidle et al. U.S. Pat. 3,232,903, issued Feb. 1, 1966 and Osmond U.S. Pat. 3,317,635, issued May 2, 1967. Acrylic resins are well known in the art and have been used to prepare coating compositions as shown in Johnson U.S. Pats. 2,782,131 and 2,782,132, both issued Feb. 19, 1957; Crissey U.S. Pat. 2,934,509, issued Apr. 26, 1960, and Parker U.S. Pat. 3,477,969, issued Nov. 11, 1969. Alkyd resins have been utilized in enamel coating compositions for trucks and automobiles as shown in Moffett and Walus U.S. Pat. 3,102,866, issued Sept. 3, 1963 and Haubert, U.S. Pat. 3,228,787, issued Jan. 11, 1966. However, there is a need for a process which will prepare a high quality alkyd-acrylic graft copolymer wherein the acrylic side chain constituents are completely grafted onto the alkyd resin backbone segment.

The novel process of this invention provides an alkyd-acrylic resin graft copolymer of high quality wherein the acrylic side chains are fully graft onto the alkyd resin backbone and coating compositions prepared from these polymers are of excellent quality and can be utilized as a coil coating, as coatings for trucks, automobiles, appliances, such as refrigerators, stoves, washing machines, dryers and the like.

SUMMARY OF THE INVENTION

The process of this invention for preparing a graft copolymer having an alkyd resin backbone and side chain segments of polymerized ethylenically unsaturated monomers comprises the following steps:

(1) Blending about 30–70% by weight of an alkyd resin having reactive hydroxyl groups with about 0.1–10% by weight of an acrylic hydroxy containing monomer which is either a hydroxy alkyl methacrylate or a hydroxy alkyl acrylate wherein the alkyl groups have 2–4 carbon atoms and 29.9–69.9% by weight of other ethylenically unsaturated monomers which are either styrene, alkyl methacrylate having 1–8 carbon atoms in the alkyl group, alkyl acrylate having 2–8 carbon atoms in the alkyl group, acrylonitrile, methacrylonitrile or mixtures of these monomers with about 0.1–4% by weight of a vinyl polymerization catalyst;

(2) Reacting the mixture prepared above for about 2–15 hours, preferably at 50–200° C.;

(3) Adding about 0.1–2% by weight, based on the weight of the reaction mixture, of a heat reactive condensate which is either a urea/formaldehyde or a melamine/formaldehyde which has at least been partially reacted with an alcohol having 1–4 carbon atoms and 0.1–2% by weight of an acid catalyst; and (4) Reacting the mixture for an additional 0.1–3 hours, preferably at 50–150° C., to form the graft copolymer.

The graft copolymer prepared according to the aforementioned process and the coating compositions prepared from this graft copolymer having a polymer solids content of about 10–70% by weight also are part of this invention.

DESCRIPTION OF THE INVENTION

In the improved process of this invention, the backbone of an alkyd resin is blended with an acrylic hydroxy containing monomer and other ethylenically unsaturated monomers which form the side chain units of the graft copolymer and with about 0.1–4% by weight of a vinyl polymerization catalyst and the mixture is reacted for about 2–15 hours, preferably about 6–10 hours at about 50–200° C., preferably temperatures of about 100–150° C. are utilized. To this reaction mixture about 0.1–2% by weight, based on the weight of the reaction mixture, of a melamine/formaldehyde resin or a urea/formaldehyde resin and about 0.1–2% of an acid catalyst are added, and polymerization is continued for about 0.1–3 hours, preferably, about 0.5–2 hours, preferably at about 75–125° C. to form the graft copolymer.

About 0.1–10% by weight and preferably about 3–6% by weight based on the weight of the graft copolymer of an alkyl hydroxy containing monomer, is utilized in the process of this invention to form the side chain. Typical hydroxy alkyl containing monomers are hydroxy alkyl acrylates and hydroxy alkyl methacrylates or mixtures thereof. These monomers contain 2–4 carbon atoms in the alkyl group and are, for example, hydroxy ethyl methacrylate, hydroxy propyl methacrylate, hydroxy butyl methacrylate, hydroxy isobutyl methacrylate and the like, hydroxy ethyl acrylate, hydroxy propyl acrylate, hydroxy butyl acrylate, hydroxy isopropyl acrylate, hydroxy isobutyl acrylate and the like.

About 29.9–69.9% by weight and preferably 32–44% by weight of other ethylenically unsaturated constituents are used in the novel process of this invention to form the side of the graft copolymer. Typical constituents are styrene, alkyl methacrylate having 1–8 carbon atoms in the alkyl group such as methyl methacrylate, ethyl methacrylate, propyl methacrylate, butyl methacrylate, pentyl methacrylate, hexyl methacrylate, octyl methacrylate, 2-ethylhexyl methacrylate; an alkyl acrylate having 2–8 carbon atoms in the alkyl group such as ethyl acrylate, propyl acrylate, butyl acrylate, pentyl acrylate, hexyl acrylate, 2-ethylhexyl acrylate and the like, acrylonitrile, methacrylonitrile and mixtures of these monomers.

The vinyl polymerization catalysts utilized in the process of this invention to prepare the graft copolymer can be any of the conventional catalysts utilized for this purpose such as the peroxygen types. For example, the following can be used: benzoyl peroxide, lauroyl peroxide, acetyl peroxide, cumene hydroperoxide, paramethane hydroperoxide, t-butyl peroxy isobutyrate, t-butyl peracetate, t-butyl peroxy pivalate, ditertiary butyl peroxide and the like.

The alkyd resin utilized in the process of this invention can be any of the conventional alkyd resins provided that reactive hydroxyl groups are in available form on the alkyd resin. Preferably about 50–60% by weight of an alkyd resin is used. These alkyd resins are prepared by conventional polymerization techniques in which a drying oil fatty acid, a polycarboxylic acid or an anhydride thereof or a mixture of a polycarboxylic acid and an anhydride of a polycarboxylic acid, a polyhydric alcohol, a solvent and a polymerization catalyst are blended together and heated to about 150–260° C. for about 2–10 hours to form an alkyd resin having a molecular weight of 1,000–10,000, preferably about 2,000–5,000.

Typical solvents and diluents which are used to prepare these alkyd resins are, for example, toluene, xylene, butyl acetate, methylisobutyl ketone, methylethyl ketone, butyl alcohol, hexane cellosolve, cellosolve acetate and other aliphatic, cycloaliphatic, aromatic hydrocarbons, esters, ethers, ketones and alcohols.

In the preparation of these alkyd resins, about 0.1–4% by weight, based on the total weight of the constituents used to prepare the alkyd resin, of a polymerization catalyst is used such as sulfonic acid, organic tin compounds, such as dibutyl tin dilaurate, dibutyl tin oxide, litharge, titanium complexes, tetramethyl ammonium chloride, aromatic hydroxide compounds such as benzotrimethylammonium hydroxide.

The alkyd resin prepolymer basically consists of 10–60% by weight of a fatty acid which is either drying oil fatty acid or a non-drying oil fatty acid, 10–30% by weight of a polyhydric alcohol, and 10–30% by weight of a polycarboxylic acid or an anhydride of a polycarboxylic acid or a mixture of the acid and an anhydride.

Typical drying oil fatty acids which are used to prepare the alkyd resin are tung oil fatty acids, linseed oil fatty acids, dehydrated castor oil fatty acids; soyabean oil fatty acids, tall oil fatty acids, and the like. Typical non-drying oil fatty acids which can be utilized are cottonseed oil fatty acids, peanut oil fatty acids, olive oil fatty acids, castor oil fatty acids and coconut oil fatty acids.

The polyhydric alcohol utilized in preparing the alkyd resin prepolymer can be a polyol containing 3–10 hydroxyl groups having a molecular weight of about 90–1,000 or a diol or a blend of a polyol and a diol.

Typically useful polyols which can be used to form the alkyd resin are of the formula

$$R^2{}_mC(CH_2OH)_n$$

wherein $R^2$ is either hydrogen, OH, or an alkyl group having 1–3 carbon atoms, and wherein $n$ and $m$ are positive integers and $n$ can be 2 to 4 and $m$ can be 0 to 2. Typical polyols of this type are trimethylol propane, trimethylol ethane, pentaerythritol, dipentaerythritol and glycerin.

Other polyols that can be used to form the alkyd resin are sorbitol, mannitol, α-methylglucoside and hexane triol. Resinous polyols can also be used such as a reaction product of styrene and allyl alcohol.

Diols can be utilized to form the alkyd resin of the general formula HO—$R^3$—OH, wherein $R^3$ is an aliphatic group or an alicyclic group. Typical diols that can be used are, for example, ethylene glycol, propylene glycol, diethylene glycol, dipropylene glycol, butane diol, pentane diol, decamethylene glycol, neopentyl glycol, 1,4-cyclohexane dimethanol.

The polycarboxylic acid constituent used to prepare the alkyd resin can be any of the following aromatic dicarboxylic acids, aliphatic dicarboxylic acids, alicyclic dicarboxylic acids or the anhydrides of any of these acids:

saturated aliphatic dicarboxylic acids, such as succinic, glutaric adipic, pimelic, suberic, azelaic, brassic, dodecanedoic and the like;
alicyclic dicarboxylic acids, such as hexahydroisophthalic acid, hexahydroterephthalic acid, tetrahydroisophthalic acid, tetrahydroterephthalic acid, hexahydrophthalic acid, tetrahydrophthalic acid;
aromatic dicarboxylic acids, such as isophthalic acid, terephthalic acid, orthophthalic acid and the like; naphthalene dicarboxylic acid; bibenzoic dicarboxylic acid; isopropylidene dibenzoic acid; methylene dibenzoic acid; hexafluoroisopropylidene dibenzoic acid; ketodibenzoic acid; oxydibenzoic acid; thiodibenzoic acid; sulfonedibenzoic acid.

Tricarboxylic acids or their anhydrides can also be used as a polycarboxylic acid constituent for the alkyd resin prepolymer such as trimellitic acid and trimellitic anhydride.

Up to 50% by weight of other monobasic acids can be utilized in preparing the alkyd resin, such as benzoic acid, acetic acid, propionic acid, caproic acid, pelargonic acid, lauric acid, palmetic acid, stearic acid, and the like.

Typical alkyd resins useful in the novel process of this invention are as follows: phthalic acid/pentaerythritol/glycerine; castor oil/glycerine/phthalic acid; phthalic anhydride/soya bean oil/glycerine.

A heat reactive condensate such as urea/formaldehyde or a melamine/formaldehyde is used in the novel process of this invention to prepare the graft copolymer. The melamine/formaldehyde resin has at least been partially reacted with an alcohol and are those well known in the art. The preferred alkylolated melamine/formaldehyde resins have 1–4 carbon atoms in the alkyl group and prepared by conventional techniques in which the lower alkyl alcohol such as methanol, ethanol, butanol, isobutanol, propanol, isopropanol and the like, is reacted with the melamine formaldehyde resin to provide pendent alkoxy groups. In general, other melamine/formaldehyde resins that are methylolated and have 3–6 methylol groups are useful in the process of this invention. One useful partially methylolated melamine/formaldehyde resin is a resin of melamine/formaldehyde/methanol having a molar ratio of 1/5/3. Another particularly useful resin is hexamethoxy methyl melamine.

Preferably about 0.1–2% by weight, and more preferably 0.5–1% by weight of an acid catalyst is used with the heat reactive condensate in the process of this invention to prepare the graft copolymer. However, with some melamine/formaldehyde resins the catalyst is not required but is still preferred. Typical strong acid catalysts are sulfuric acid, sulfonic acid, paratoluene sulfonic acid, naphthalene sulfonic acid, hydrochloric acid, phosphoric acid, azelaic acid, citric acid and mixtures thereof.

Coating compositions prepared from the novel graft copolymer formed from the process of this invention can contain pigments in amounts from about 0.1–30% by weight. Typical pigments which can be used to form these coating compositions are metallic oxides, such as titanium oxide, zinc oxide, iron oxide, and the like, metal hydroxides, metal flakes, metal powders, chromates, such as lead chromates, sulfides, sulfates, carbonates, carbon black, silica, talc, china clay, iron blues, organic reds, and other organic dyes and lakes. These pigments are introduced into the coated composition by first forming a mill base with the graft copolymer by conventional sand grinding or ball milling techniques. The mill base is then blended with the film-forming graft copolymer to form the coating composition.

The novel graft copolymer prepared according to the process of this invention can be applied to a variety of substrates such as steel, aluminum, zinc, copper and other metals, glass, plastics and the like by conventional techniques, such as brushing, spraying, electrostatic spraying, flowcoating, dip coating, roller coating, electrodeposition and the like. After the coating is applied, it is baked from 1 minute to 90 minutes at about 100–250° C.

Coatings prepared from the novel graft copolymer formed according to the process of this invention form a finish which is hard, flexible, durable, weatherable, scratch and grease resistant, and the coating is particularly suitable for appliances, auto bodies, airplane equipment, railroad equipment, vending machines, outdoor equipment, outdoor metal sliding doors, such as aluminum sliding doors, and the like. The composition can be used in coil coating where the coated sheet metal is to be subjected to post-forming techniques; for example, coated aluminum for exterior siding and coated sheets for parts of appliances.

The following examples illustrate the invention. All quantities are on a weight basis unless otherwise indicated.

EXAMPLE 1

The following ingredients are charged into a reaction vessel equipped with a stirrer, thermometer, reflux condenser, a nitrogen inlet and an addition funnel:

| | Parts by weight |
|---|---|
| Portion 1: | |
| Castor oil alkyd resin solution (60% solids in xylene of an alkyd resin of 55.0% castor oil/41.9% glycerol phthalate/3.1% excess glycerine) | 1320.00 |
| Xylene | 532.00 |
| t-Butyl peracetate solution (75% solids in mineral spirits) | 4.98 |
| Portion 2: | |
| Hydroxy ethyl acrylate monomer | 66.00 |
| Styrene monomer | 286.00 |
| Methyl methacrylate monomer | 286.00 |
| t-Butyl peracetate solution (described above) | 9.97 |
| Portion 3: | |
| t-Butyl peracetate solution (described above) | 4.98 |
| Portion 4: | |
| t-Butyl peracetate solution (described above) | 4.98 |
| Portion 5: | |
| Xylene | 191.00 |
| Total | 2705.91 |

The ingredients in the reaction vessel are under constant agitation during the reaction.

Portion 1 is charged into the reaction vessel. The mixture is heated to 118° C. Portion 2 is then slowly added over a 2-hour period while maintaining the reaction mixture is held at the above temperature. Portion 3 is added and the reaction mixture is held at the above temperature for an additional 3 hours. Portion 4 is added and the reaction mixture is held at the above temperature for an adidtional 3 hours. Portion 5 is added and the solution is cooled to room temperature. The polymer solution has a 60% polymer solids content and a Gardner Holdt viscosity at 25° C. of $Z_3$. The polymer solution has a hazy appearance, a 60% polymer solids content and a Gardner Holdt viscosity at 25° C. of $Z_3$.

A 10-mil thick film is cast on a glass plate. The wet film is hazy and after drying for 24 hours, the resulting film has a hazy appearance. This indicates that a polymer blend has formed in the above reaction.

A graft copolymer is prepared as follows:

| | Parts by weight |
|---|---|
| Polymer solution (prepared above) | 250.00 |
| Hexamethoxymethyl melamine | 1.05 |
| Paratoluene sulfonic acid solution (20% solids in isopropanol) | 1.05 |
| Xylene | 7.00 |
| Total | 259.10 |

The above ingredients are charged into a reaction vessel and heated to 100° C. and held at this temperature for 1 hour. The resulting solution is clear and stable. Films cast from the solution are clear and the films after being dried for 24 hours are clear which indicates a graft copolymer is formed.

EXAMPLE 2

The following ingredients are charged into a reaction vessel equipped with a stirrer, thermometer, reflux condenser, a nitrogen inlet and an additional funnel:

| | Parts by weight |
|---|---|
| Portion 1: | |
| RC-305 soya alkyd resin solution (55% solids in xylene of a resin of 43% soya bean oil/52% glycerol phthalate/5% excess glycerine) | 820.00 |
| Xylene | 325.00 |
| t-Butyl peracetate solution (75% solids in mineral spirits) | 3.52 |
| Portion 2: | |
| Styrene monomer | 565.00 |
| Hydroxyethyl acrylate monomer | 43.00 |
| t-Butyl peracetate solution (described above) | 7.04 |
| Portion 3: | |
| t-Butyl peracetate solution (described above) | 3.52 |
| Portion 4: | |
| t-Butyl peracetate solution (described above) | 3.52 |
| Total | 1770.60 |

The ingredients in the reaction vessel are under constant agitation during the reaction. Portion 1 is charged into a reaction vessel and heated to 114° C. Portion 2 is premixed and slowly added to the reaction vessel over a 1-hour and 15-minute period while the reaction mixture is held at the above temperature. Portion 3 is added and the reaction mixture is held at the above temperature for an additional 4 hours. Portion 4 is added and the reaction mixture is held at the above temperature for an additional 4 hours. The resulting polymer solution has a 58.2% polymer solids content and a Gardner Holdt viscosity at 25° C. of $Z_4$. The polymer solution is cloudy and films cast from the solution are cloudy.

A graft copolymer is then prepared as follows:

| | Parts by weight |
|---|---|
| Polymer solution (prepared above) | 250.00 |
| Hexamethoxymethyl melamine | 0.75 |
| Para toluene sulfonic acid solution (20% solids in isopropanol) | 0.75 |
| Xylene | 5.80 |
| Total | 257.30 |

The above ingredients are charged into a reaction vessel and heated to 100° C. and held at this temperature for ½ hour. The resulting solution is clear and stable. Films cast from the solution are clear and the films after being dried for 24 hours are clear which indicates a graft copolymer is formed.

What is claimed is:
1. A process for preparing a graft copolymer having an alkyd resin backbone and side chains of polymerized ethylenically unsaturated monomers which comprises the following steps:
(1) blending about 30–70% by weight of an alkyd resin having reactive hydroxyl groups with about 0.1–10% by weight of an acrylic hydroxy containing monomer selected from the group consisting of a hydroxy alkyl acrylate, a hydroxy alkyl methacrylate and mixtures thereof, in which the alkyl groups have 2–4 carbon atoms and 29.9–69.9% by weight of other ethylenically unsaturated monomers selected from the group consisting of styrene, alkyl methacrylate having 1–8 carbon atoms in the alkyl group, alkyl acrylate having 2–8 carbon atoms in the alkyl group, acrylonitrile, methacrylonitrile, and mixtures thereof and with about 0.1–4% by weight of a vinyl polymerization catalyst;

(2) reacting the mixture for about 2–15 hours at 50 to 200° C.;

(3) adding about 0.1–2% by weight based on the weight of the reaction mixture, of a heat reactive condensate to the reaction mixture in which the heat reactive condensate is selected from the group consisting of urea/formaldehyde and a melamine/formaldehyde resin which is at least partially reacted with an alcohol having 1–4 carbon atoms and about 0.1–2% by weight of an acid catalyst; and (4) reacting the mixture for about 0.1–3 hours at 50–150° C. to form the graft copolymer.

2. The process of claim 1 wherein in step (2) the reaction is carried out at about 100–150° C. for 6–10 hours and in step (4), the reaction is carried out at about 75–125° C. for about 0.5–2.0 hours.

3. The process of claim 2 wherein the constituents used to form said graft copolymer consist essentially of 50–65% by weight of an alkyd resin, 3–6% by weight of an acrylic hydroxy containing monomer, and 32–44% by weight of other ethylenically unsaturated monomers.

4. The process of claim 3 in which the alkyd resin is prepared from reactants consisting essentially of 10–60% by weight of a fatty acid selected from the group consisting of drying oil fatty acids and non-drying oil fatty acids, 10–30% by weight of a polyhydric alcohol and 10–30% by weight of a polybasic acid or an anhydride of a polybasic acid.

5. The process of claim 4 in which the drying oil fatty acid reactant is selected from the group consisting of linseed oil fatty acid, tall oil fatty acid, tung oil fatty acids, dehydrated castor oil fatty acid, and soya oil fatty acid, and the polyhydric alcohol reactant is selected from the group consisting of glycerol, pentaerythritol, trimethylol propane, trimethylol ethane, sorbitol, mannitol, methyl glucoside, hexane triol, ethylene glycol, propylene glycol, diethylene glycol, propylene glycol, dipropylene glycol, butane diol, pentane diol, tetramethylene glycol, neopentyl glycol, and cyclohexane dimethanol and the polybasic acid or anhydride reactant is an aromatic polycarboxylic acid or its anhydride.

6. The process of claim 4 in which the backbone consists essentially of a castor oil alkyd resin and the side chains consist essentially of methyl methacrylate, styrene and hydroxy ethyl acrylate.

7. The process of claim 4 in which the backbone consists essentially of an alkyd resin prepared from castor oil and glycerol phthalate and the side chains consist essentially of hydroxy ethyl acrylate, methyl methacrylate and styrene and the melamine resin is hexamethoxy methyl melamine and the acid catalyst is paratoluene sulfonic acid.

8. The process of claim 4 in which the backbone consists essentially of an alkyd resin prepared from soya oil and glycerol phthalate and the side chains consist essentially of styrene and hydroxy ethyl acrylate, the melamine resin consists essentially of hexamethoxy methyl melamine and the acid catalyst consists essentially of paratoluene sulfonic acid.

9. A graft copolymer prepared according to the process of claim 1 having an alkyd resin backbone and side chains of polymerized acrylic monomer units.

10. A coating composition consisting essentially of 10–70% by weight, based on the weight of the coating composition, of the polymer prepared according to claim 1 and correspondingly 30–90% by weight of a solvent for the polymer.

11. A coating composition containing 10–70% by weight of the graft copolymer prepared according to the process of claim 7 and correspondingly 30–90% by weight of a solvent for the graft copolymer.

12. A coating composition containing 10–70% by weight of the graft copolymer prepared according to the process of claim 8 and correspondingly 30–90% by weight of a solvent for the graft copolymers.

References Cited
UNITED STATES PATENTS

| | | | |
|---|---|---|---|
| 3,457,324 | 7/1969 | Sekmakas | 260—850 |
| 3,133,032 | 5/1964 | Jen et al. | 260—21 |
| 3,317,635 | 5/1967 | Osmond | 260—881 |
| 3,459,690 | 8/1969 | Baugh et al. | 260—22 |
| 3,502,557 | 3/1970 | Yurcheshen et al. | 204—181 |
| 3,536,641 | 10/1970 | Sekmakas et al. | 260—22 |
| 3,600,345 | 8/1971 | Levine et al. | 260—22 |

FOREIGN PATENTS

| | | | |
|---|---|---|---|
| 815,179 | 6/1959 | Great Britain | 260—850 |

M. J. WELSH, Primary Examiner

R. W. GRIFFIN, Assistant Examiner

U.S. Cl. X.R.

117—124 E, 161 K; 260—22 CB, 23 P, 850, 873